United States Patent
Jang

(10) Patent No.: US 8,036,650 B2
(45) Date of Patent: Oct. 11, 2011

(54) MOBILE TERMINAL FOR REMOTELY CONTROLLING AND METHOD OF REMOTELY CONTROLLING THE SAME

(75) Inventor: Jung Eun Jang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 939 days.

(21) Appl. No.: 12/015,194

(22) Filed: Jan. 16, 2008

(65) Prior Publication Data
US 2008/0220761 A1  Sep. 11, 2008

(30) Foreign Application Priority Data

Mar. 8, 2007 (KR) .......................... 10-2007-0022953

(51) Int. Cl.
*H04M 3/00* (2006.01)
(52) U.S. Cl. .................. 455/420; 455/419; 455/557
(58) Field of Classification Search .................... None
See application file for complete search history.

(56) References Cited

U.S. PATENT DOCUMENTS
2003/0040334 A1* 2/2003 Lee .............................. 455/557

FOREIGN PATENT DOCUMENTS
| KR | 1020000009453 | 2/2000 |
| KR | 1020060018444 | 3/2006 |
| KR | 1020060030959 | 4/2006 |
| KR | 102007000148 | 1/2007 |

* cited by examiner

*Primary Examiner* — Erika Gary
(74) *Attorney, Agent, or Firm* — The Farrell Law Firm, P.C.

(57) ABSTRACT

A mobile terminal for remotely controlling and a method of remotely controlling the same that enable remote control operation of the mobile terminal by connecting a remote control device and the mobile terminal are provided. The method of remotely controlling a mobile terminal includes transmitting a key code from a remote control device by user request; receiving and recognizing the key code in the mobile terminal; converting the key code to an operation code of the mobile terminal; and controlling data output operation according to the operation code.

23 Claims, 4 Drawing Sheets

MOBILE TERMINAL FOR REMOTELY CONTROLLING AND METHOD OF REMOTELY CONTROLLING THE SAME

PRIORITY

This application claims priority under 35 U.S.C. §119(a) to a Korean Patent Application entitled "MOBILE TERMINAL FOR REMOTELY CONTROLLING AND METHOD OF REMOTELY CONTROLLING THE SAME" filed in the Korean Intellectual Property Office on Mar. 8, 2007 and assigned Serial No. 2007-0022953, the contents of which are incorporated herein by reference.

BACKGROUND OF THE INVENTION

1. Field of the Invention

The present invention relates to a mobile terminal, and in particular, to a mobile terminal for remotely controlling and a method of remotely controlling the same that enable remote control of operation of the mobile terminal by connecting a remote control device and the mobile terminal.

2. Description of the Related Art

Due to development of communication technology and semiconductor technology, various types of mobile terminals are now widely used. Today, these mobile terminals have various functions such as wireless Internet, wireless local area communication, and mobile broadcasting reception as well as a conventional communication function such as a voice communication service or a character messaging service, and has developed in a size, design, resolution, and user interface.

The mobile terminal further has a multimedia function such as image or moving picture reproduction, MP3 reproduction, digital broadcasting reception and reproduction, and photography. In order to efficiently embody such a multimedia function, a display unit of the mobile terminal has been improved, and a stereo effect is provided in a speaker of the mobile terminal.

However, because the mobile terminal performs communication while moving, the display unit and the speaker for embodying a multimedia function have a limited size. That is, the mobile terminal outputs multimedia data through a display unit and speaker provided inside the mobile terminal, however the display unit and speaker have a limited size due to problems such as portability, a manufacturing cost, and consumption power of the mobile terminal.

Thereby, the mobile terminal has a limitation in providing multimedia data. In order to overcome this limitation, the mobile terminal outputs multimedia data of the mobile terminal to an external device.

For example, a TV-OUT function is added to the mobile terminal. A mobile terminal for outputting broadcasting data output from the mobile terminal by the TV-OUT function through a display unit of the external device is provided.

However, the mobile terminal is used only to output broadcasting data of the mobile terminal by connecting to the external device. Furthermore, when the mobile terminal is connected to the external device by the TV-OUT function, the output control of data is performed by key manipulation of either the mobile terminal or the external device. Therefore, when data of the mobile terminal connected to the external device are output by a TV-OUT function, it is inconvenient to perform the output control of the data from a remote location.

Further, when the mobile terminal connected to the external device outputs data, a display unit of the mobile terminal is turned off after a predetermined time duration elapses. Therefore, in order to manipulate a key, the user should turn oil the display unit and perform key manipulation for controlling operations such as volume adjustment of the data and channel conversion.

In the related art, the operation control of volume adjustment, channel conversion, suspension, fast-forward winding, and reverse winding of the broadcasting data output through the external device is performed by only key manipulation of the mobile terminal. In the related art, when the mobile terminal is connected to the external device, in order to control operation of the mobile terminal, the mobile terminal should be used. Accordingly, when viewing broadcasting data at a location remote from the mobile terminal, the user moves to the mobile terminal in order to control the operation of the mobile terminal.

In the related art, data being reproduced in the mobile terminal can be output using the external device, and the external device can be controlled by the mobile terminal; however, the mobile terminal cannot be controlled from a remote location.

SUMMARY OF THE INVENTION

An aspect of the present invention is to substantially solve at least the above problems and/or disadvantages and to provide at least the advantages below. Accordingly, one aspect of the present invention provides a mobile terminal for remotely controlling and a method of remotely controlling the same that enable remote control of operation of the mobile terminal.

Another aspect of the present invention is to provide a mobile terminal for remotely controlling and a method of remotely controlling the same that enable control of operation of the mobile terminal from a remote location using a preset key code.

Yet another aspect of the present invention is to provide a mobile terminal for remotely controlling and a method of remotely controlling the same that enable control of operation of the mobile terminal using a remote control device when data being reproduced in the mobile terminal are output using an external device.

Another aspect of the present invention further provides a mobile terminal and a method of controlling the same that can perform control operations related to data reproduction by controlling the mobile terminal using a remote control device when the mobile terminal reproduces data using an external device.

According to another aspect of the present invention, there is provided a method of remotely controlling a mobile terminal. The method includes transmitting a key code from a remote control device by user request; receiving and recognizing the key code in the mobile terminal; converting the key code to an operation code of the mobile terminal; and controlling data output operation according to the operation code.

According to another aspect of the present invention, there is provided a method of remotely controlling a mobile terminal. The method includes outputting, when the mobile terminal is connected to an external device, data through the external device; identifying an event requested while outputting the data; converting, if the event is a remote control signal, the remote control signal to an operation code; and converting data for output through the external device to correspond to the operation code, and outputting the converted data through the external device.

According to yet another aspect of the present invention, there is provided a mobile terminal. The mobile terminal includes a memory unit for storing an application required for controlling operation of the mobile terminal and storing an operation code mapped to a key code generated by a remote control device; an external interface unit for connecting the mobile terminal and an external device; a local area wireless communication module for receiving a remote control signal from the remote control device; and a controller for controlling operation of the mobile terminal according to the remote control signal received from the remote control device.

BRIEF DESCRIPTION OF THE DRAWINGS

The objects, features and advantages of the present invention will be more apparent from the following detailed description in conjunction with the accompanying drawings, in which.

DETAILED DESCRIPTION OF PREFERRED EMBODIMENTS

Figure 1:
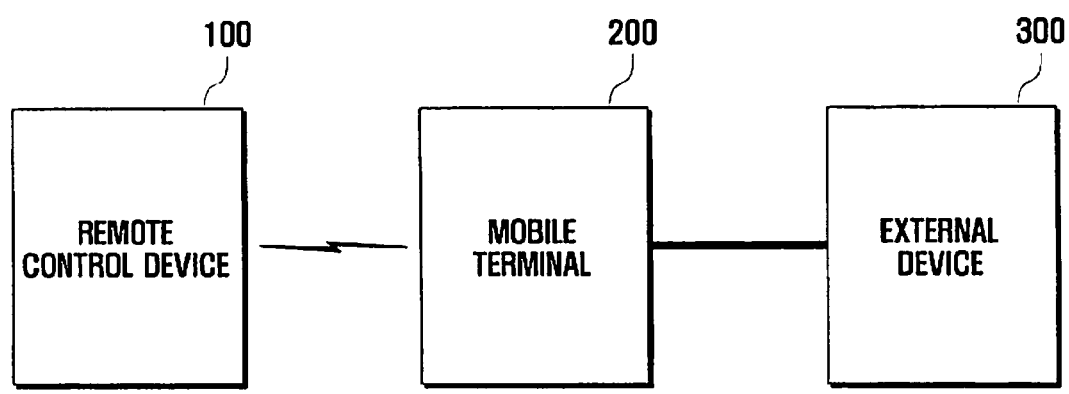
FIG. 1 is a block diagram illustrating a configuration of a remote control system according to the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In an exemplary embodiment of the present invention, when a mobile terminal is connected to an external device, user convenience is enhanced by controlling the operation of the mobile terminal from a remote location using a remote control device. The external device is connected to the mobile terminal using an interface to receive and output music, image, presentation data, moving picture, and digital broadcasting being reproduced in the mobile terminal. A representative external device is a television (TV). A representative output function using the external device is a TV-OUT function. The interface is one of a wire interface such as a cable and a wireless interface using local area wireless communication.

The TV-OUT function is performed by connecting the mobile terminal and the external device, for example, through a cable. Accordingly, a moving picture or digital broadcasting data (hereinafter, broadcasting data) being reproduced in the mobile terminal is output through a display unit of the external device.

In the present invention, because the mobile terminal can be controlled using a remote control device, the user can conveniently control operation of the mobile terminal from a remote location while viewing broadcasting data through the external device connected to the mobile terminal.

Moreover, the mobile terminal is representatively exemplified as a mobile communication terminal, however the present invention is not limited thereto.

Accordingly, the mobile terminal according to present invention is a terminal that can be remotely controlled through local area wireless communication, and may be a communication appliance and a multimedia appliance having a local area wireless communication module and external interface, for example a mobile communication terminal such as an International Mobile Telecommunication 2000 (IMT-2000) terminal, Wideband Code Division Multiple Access (WCDMA) terminal, and Universal Mobile Telecommunication Service (UMTS) terminal; a multimedia player such as a Portable Multimedia Player (PMP) and MP3 player; and a digital broadcasting receiver, Personal Digital Assistant (PDA), smart phone, and mobile phone, and applications thereof. The mobile terminal may further include an input device such as a separate keypad, pointing device, and side key in addition to a touch screen.

According to the present invention, the local area wireless communication is exemplified as infrared communication, however the local area wireless communication can use various wireless communication networks for forming a communication channel in a local area and transmitting and receiving a signal, such as infrared communication, Bluetooth® (hereinafter "Bluetooth") communication, and Zigbee communication.

With infrared communication, data can be transmitted wirelessly using infrared rays. Infrared communication is applied to a mobile terminal to be used to remotely control electronic appliances, such as, a TV and an air conditioner and to transmit a phone book, image, and bell ring of the mobile terminal to another mobile terminal through infrared communication.

However, when the mobile terminal performs a function as a remote control device for controlling electronic appliances, the mobile terminal can control operation of the electronic appliances in a remote control mode, and the mobile terminal performs only a transmission function of remotely controlling the electronic appliances.

According to present invention, at least one key code is preset in a remote control device, and the mobile terminal is remotely controlled using the key code. The key code is set to each key of the remote control device according to a manufacturing company and product of the remote control device.

FIG. 1 is a block diagram illustrating a configuration of a remote control system according to an exemplary embodiment of the present invention.

In FIG. 1, the remote control system includes a remote control device 100 for transmitting a key code for controlling operation of a mobile terminal 200 from a remote location, the mobile terminal 200 for reproducing data according to user request, outputting the reproduced data through an external device 300, and controlling operations related to data reproduction according to a key code transmitted from the remote control device 100, and the external device 300 for output of data transferred from the mobile terminal 200.

The remote control device 100 receives a key signal input by the user, generates a key code corresponding to the key signal, and transmits the generated key code to the mobile terminal 200 through local area wireless communication. The key code corresponding to the key signal can be converted and transmitted by a modulation method of local area wireless communication.

The key code is shared by the remote control device 100 and the mobile terminal 200. That is, the key code is a preset value between the remote control device 100 and the mobile terminal 200.

In operation, the mobile terminal 200 receives the key code from the remote control device 100 through local area wireless communication. Thereafter, the mobile terminal 200 recognizes the received key code and converts the key code to an operation code of the mobile terminal 200. The mobile terminal 200 controls operation of data output to the external device 300 according to the converted code. This is the same operation as the data output control operation of the mobile terminal 200 performed through inputting a key signal to the mobile terminal 200.

The output data include data such as a text, moving picture, image, digital broadcasting, and music file, which can be output from the mobile terminal 200 through the external device 300. The mobile terminal 200 includes an interface unit for connecting to the external device 300. Connection of the mobile terminal 200 to the external device 300 is performed by a wire or wireless interface, or by a combination thereof. The wire interface may be a TV-OUT cable, and the wireless interface may be Bluetooth.

The external device 300 outputs data transferred from the mobile terminal 200. The external device 300 may be at least one of an external speaker, TV, screen, and computer monitor. The external device 300 includes an interface unit for connecting to the mobile terminal 200.

The user can control the mobile terminal 200 from a remote location through the remote control device 100 by using the remote control system according to exemplary embodiments of the present invention. Particularly, the user can control operation of data output from the mobile terminal 200 through the external device 300 from a remote location using the remote control device 100. For example, when viewing broadcasting through the external device 300 using a TV-OUT function, the user can easily perform volume adjustment and channel conversion from a location remote from the mobile terminal 200 using the remote control device 100.

The configuration shown in FIG. 1 is an example of a remote control system, and a remote control system according to exemplary embodiments of the present invention can be continuously modified within the configuration shown in FIG. 1.

Figure 2:
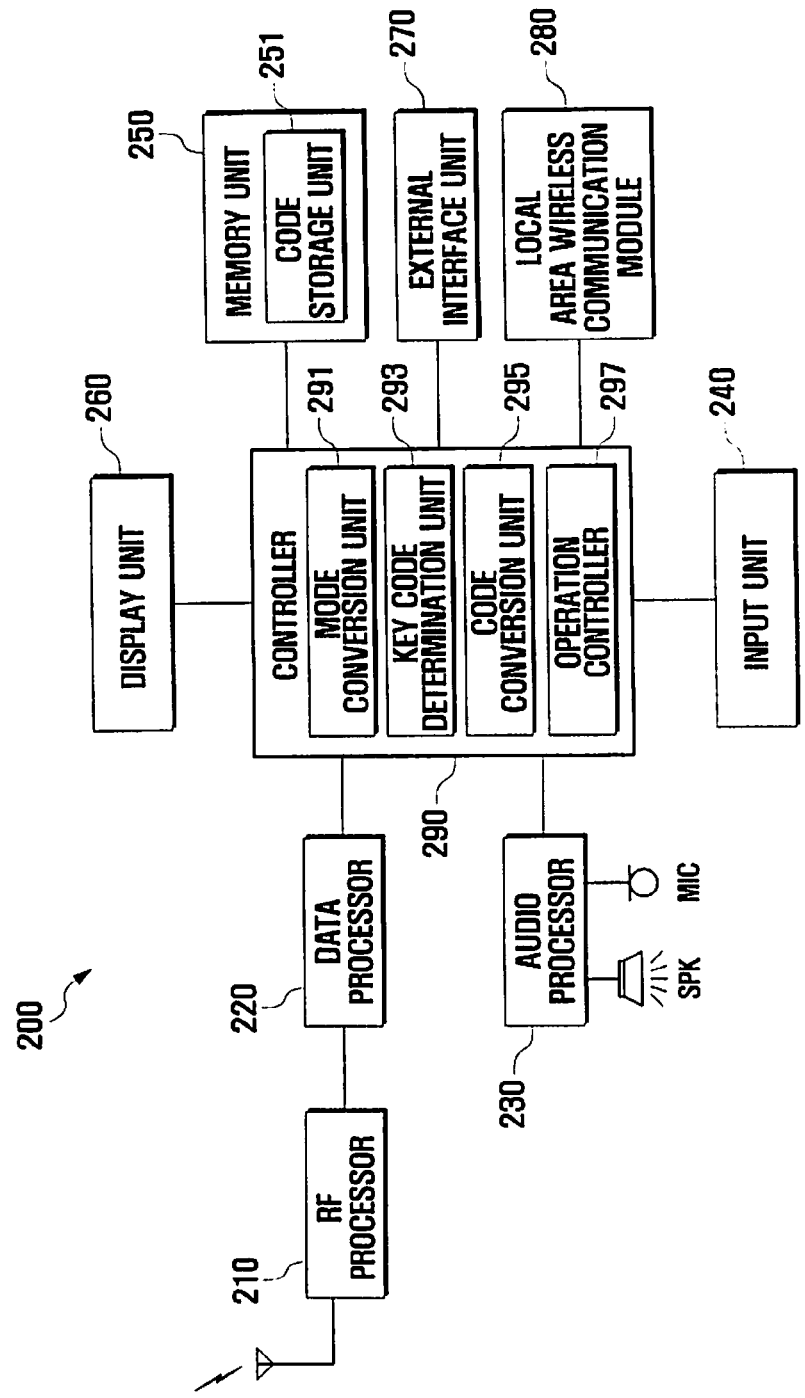
FIG. 2 is a block diagram illustrating a configuration of a mobile terminal according to the present invention.

FIG. 2 is a block diagram illustrating a configuration of a mobile terminal according to an exemplary embodiment of the present invention.

In FIG. 2, the mobile terminal 200 includes a Radio Frequency (RF) processor 210, data processor 220, audio processor 230, input unit 240, memory unit 250, display unit 260, external interface unit 270, local area wireless communication module 280, and controller 290. The memory unit 250 includes a code storage unit 251. The controller 290 includes a mode conversion unit 291, key code determination unit 293, code conversion unit 295, and operation controller 297.

The RF processor 210 performs communication of the mobile terminal 200. The RF processor 210 forms a communication channel in a mobile communication system to perform voice communication and data communication. The RF processor 210 includes an RF transmitter for up-converting a frequency of a signal to be transmitted and amplifying the signal, and an RF receiver for down-converting a frequency of a received signal and low-noise amplifying the signal.

The data processor 220 processes voice data received from the audio processor 230, numeral and character data input through the input unit 240, and data for transmission and data received through the RF processor 210. The data processor 220 includes a transmitter for encoding and modulating a signal to be transmitted through the RF processor 210, and a receiver for demodulating and decoding a signal received through the RF processor 210. The data processor 220 includes a modem and a codec. The codec includes a data codec for processing packet data and an audio codec for processing an audio signal such as a voice.

The audio processor 230 performs a function of reproducing an audio signal received from the data processor 220, and outputting an audio signal input through a microphone MIC to the data processor 220. The audio processor 230 converts voice or sound data to an audible sound and outputs the audible sound through a speaker SPK, and converts an audio signal such as a voice received from the microphone MIC to voice data and outputs the voice data.

The input unit 240 receives character information input by a user to set various functions and to control the operation of the mobile terminal 200, and transfers a corresponding key signal to the controller 290. The input unit 240 may include a touch pad, a general keypad, and a QWERTY type keypad, or a combination thereof according to a type of the mobile terminal 200. The input unit 240 further includes a function key such as a direction key, a volume key, and a hotkey for performing a specific function.

The memory unit 250 stores applications required for controlling operation according to the present invention, and data generated by the user or received from the outside of the mobile terminal. The application is a code conversion application or a mode conversion application. The memory unit 250 stores setting information related to a remote control function of the mobile terminal 200. The memory unit 250 also stores information for mapping an operation code of the mobile terminal to a key code generated in the remote control device 100. In this case, the memory unit 250 includes the code storage unit 251. The code storage unit 251 stores a key code of the remote control device 100 and mapping information for mapping the key code in a mapping table. The memory unit 250 may include at least one buffer for temporarily storing user data generated while executing the application. An example of the mapping table is shown below in Table 1.

TABLE 1

| Remote control device Keypad | Remote control device Key code | Control operation | Operation code of mobile terminal |
|---|---|---|---|
| Power key | 1 | Power on/off | 0x00/0x01 |
| Reproduction key | 10 | Reproduce | 0x10 |
| Suspension/stop key | 11 | Suspend/stop | 0x11 |
| Volume up key | 37 | Volume up adjustment | 1x00 |
| Volume down key | 38 | Volume down adjustment | 1x01 |
| Channel conversion key | 39 | Upper channel conversion | 1x10 |
| Channel conversion key | 40 | Lower channel conversion | 1x11 |

As shown in Table 1, a key code corresponding to key manipulation of the remote control device 100 and an operation code of the mobile terminal 200 for controlling operation of the mobile terminal 200 corresponding to the key code are mapped to each other in the mapping table. For example, when the user inputs the volume-up key of the remote control device 100, the remote control device 100 transmits a key code '37' corresponding to the volume up key to the mobile terminal 200. The controller 290 of the mobile terminal 200 extracts an operation code '1x00' of the mobile terminal 200 corresponding to the key code '37'. The controller 290 controls a volume-up operation of the mobile terminal 200 according to the operation code '1x00'. For example, a volume of data outputting through the external device 300 is adjusted to 'up'.

Table 1 is an example illustrating an exemplary embodiment of the present invention, however, a form of a mapping table according to this embodiment is not limited to the form of Table 1, and may be modified to incorporate other forms.

For example, the mapping table may include only a key code field of the remote control device 100 and an operation code field of the mobile terminal 200 in Table 1.

Further, such a mapping table can be added to or adjusted by the user. The amended mapping table can be shared by the remote control device 100 and the mobile terminal 200. The mapping table is generally set to the mobile terminal 200 or is downloaded from a server. Accordingly, when the mapping table is updated, it is preferable for the server to notify the mobile terminal that the mapping table is updated.

The key code transmitted to the mobile terminal can include a specific identifier in a header thereof in order to represent that the key code is a control signal for remotely controlling the mobile terminal.

The display unit 260 displays screen data generated while performing an application, and displays the user's key manipulation state and function setting information. The display unit 260 may use a Liquid Crystal Display (LCD), and the LCD may include a touch screen. In this case, the display unit 260 is also used as an input unit. The display unit 260 changes and displays screen data according to application execution by the control of the remote control device 100.

The external interface unit 270 provides an interface for connecting the mobile terminal 200 and the external device 300. The external interface unit 270 is formed with a wire or wireless interface, or a combination thereof. The wire interface may be an interface such as a data cable of the mobile terminal 200, TV-OUT cable, and preset connector. The wireless interface may be an interface such as Bluetooth and Radio Frequency Identification (RFID).

The local area wireless communication module 280 performs local area wireless communication with the remote control device 100. The local area wireless communication module 280 forms a communication channel with the remote control device 100 by a preset method and receives a control signal (key code) for controlling operation of the mobile terminal 200. The local area wireless communication module 280 uses one of Bluetooth communication, infrared communication, Zigbee communication, and RFID communication, and can use various wireless communication modules for receiving a signal by forming a communication channel in a local area.

The controller 290 controls general operations of the mobile terminal 200 and controls a signal flow between units of the mobile terminal 200. That is, the controller 290 controls a signal flow between units such as the data processor 220, audio processor 230, input unit 240, memory unit 250, display unit 260, external interface unit 270, and local area wireless communication module 280. The controller 290 may include the data processor 220.

Particularly, the controller 290 controls conversion to a remote control mode when receiving a control signal (key code) from the remote control device 100 or when detecting the connection to the external device 300. The controller 290 converts, when the mobile terminal 200 receives a key code from the remote control device 100, the key code to an operation code for controlling the operation of the mobile terminal 200 corresponding to the key code.

The controller 290 controls operation of the mobile terminal 200 by the received control signal (key code). For example, the controller 290 controls operation of data output through the display unit 260 and the speaker SPK. Furthermore, the controller 290 controls, when data are output to the outside of the mobile terminal 200 by the connection to the external device 300, operation of the output data corresponding to the key code.

In order to more efficiently perform the control operation, the controller 290 also includes a mode conversion unit 291, key code determination unit 293, code conversion unit 295, and operation controller 297.

The mode conversion unit 291 converts, when the mode conversion unit 291 receives a control signal (key code) from the remote control device 300 or detects the connection to the external device 300, a mode of the mobile terminal 200 to a remote control mode.

The key code determination unit 293 recognizes, when receiving a key code from the remote control device 100, the key code.

The code conversion unit 295 converts the recognized key code to an operation code for controlling the operation of the mobile terminal 200. The key code and the operation code mapped to the key code are shown in Table 1.

The operation controller 297 controls the operation of the mobile terminal 200 according to the converted operation code. For example, the operation controller 297 performs operations such as channel conversion, volume adjustment, fast-forward winding, and reverse winding of broadcasting data.

FIG. 2 illustrates a schematic configuration of the mobile terminal 200 according to an exemplary embodiment of the present invention. Accordingly, the mobile terminal 200 may further include, for example, a camera module and a digital broadcasting reception module according to the form thereof.

Figure 3:
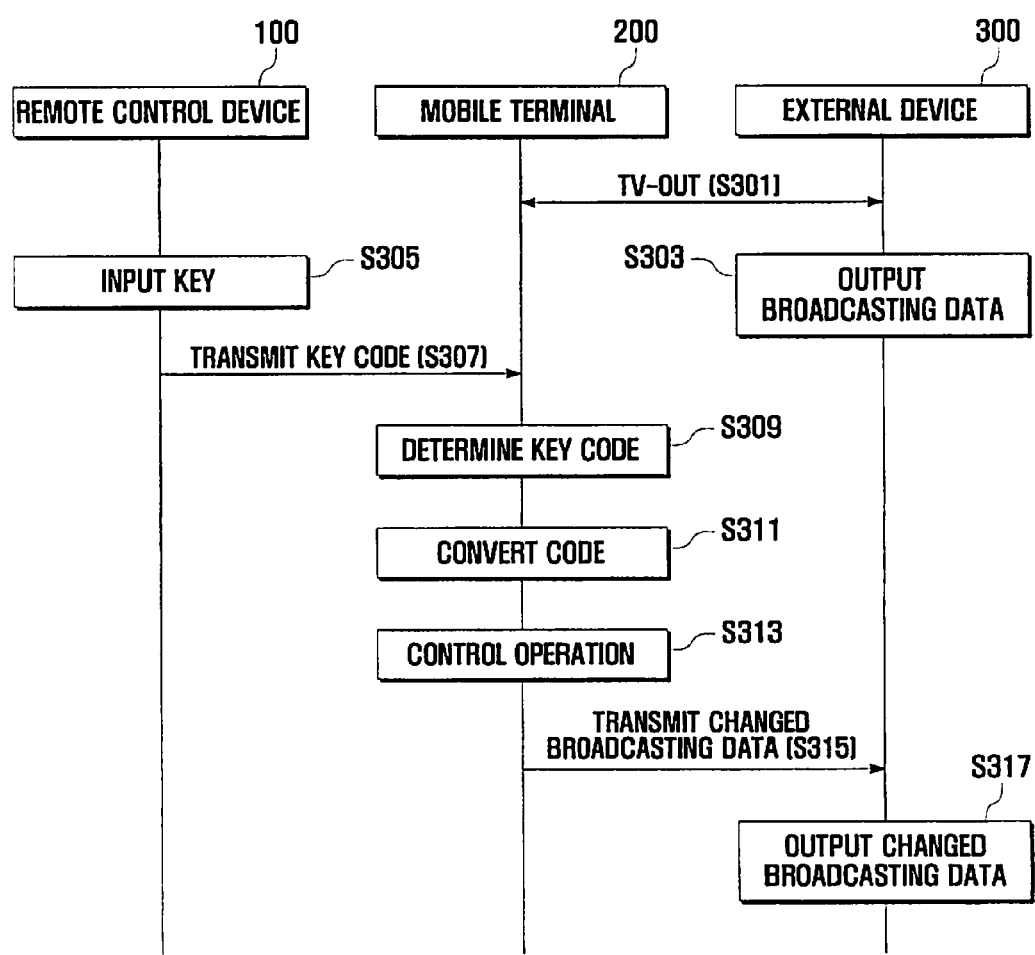
FIG. 3 is a flow diagram illustrating operations of units of a remote control system according to the present invention.

FIG. 3 is a flow diagram illustrating operations of units of a remote control system according to an exemplary embodiment of the present invention.

FIG. 3 illustrates a case in which the mobile terminal 200 outputs broadcasting data being reproduced in the mobile terminal 200 to the external device 300 through a TV-OUT function. In FIG. 3, the external device 300 may be a television.

Also in FIG. 3, the mobile terminal 200 and the external device 300 are connected by a TV-OUT function in step S301, and the external device 300 outputs broadcasting data transferred from the mobile terminal 200 in step S303. The broadcasting data include image data or sound data being reproduced in the mobile terminal 200. When the mobile terminal 200 is connected to the external device 300, the mobile terminal 200 enters a remote control mode.

When the mobile terminal 200 is connected to the external device 300 to output broadcasting data, a user controls the operation of the mobile terminal 200 from a remote location by inputting a key of the remote control device 100 in step S305.

The remote control device 100 transmits a key code corresponding to the key input of the user to the mobile terminal 200 in step S307. The key code is transmitted by local area wireless communication.

The mobile terminal 200 determines whether a key code is received from the remote control device 100 in step S309. That is, the mobile terminal 200 recognizes the received key code and compares the received key code with a preset mapping table.

The mobile terminal 200 converts the received key code to an operation code, and extracts the operation code for controlling the operation of the mobile terminal 200 corresponding to the key code in step S311. The operation code corresponds to the key code and controls the operation of the mobile terminal 200.

The mobile terminal 200 then controls the operation of the reproducing broadcasting data according to the operation code in step S313. The operation of the broadcasting data may be volume adjustment and channel change of the reproducing broadcasting data.

The mobile terminal 200 transmits the changed broadcasting data to the external device 300 in step S315.

The external device 300 outputs the broadcasting data changed by the control of the mobile terminal 200 in real time in step S317.

Figure 4:
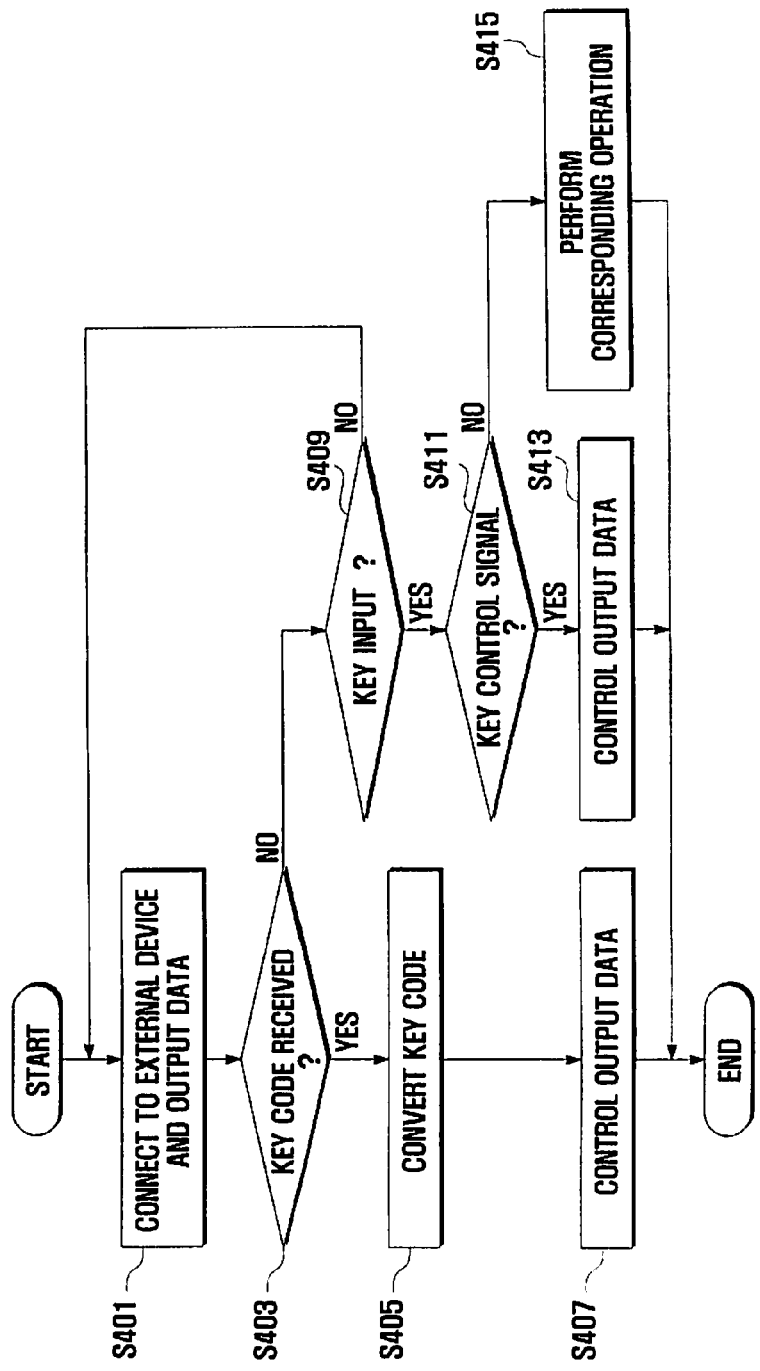
FIG. 4 is a flowchart illustrating a method of remotely controlling a mobile terminal according to the present invention.

FIG. 4 is a flowchart illustrating a method of remotely controlling a mobile terminal according to an exemplary embodiment of the present invention.

In FIG. 4, the mobile terminal 200 is connected to the external device 300 to output data through the external device 300 in step S401. When the mobile terminal 200 is connected to the external device 300, the mobile terminal 200 enters a remote control mode.

Next, the controller 290 of the mobile terminal 200 detects an event requested from the outside of the mobile terminal 200 or by input from the user while outputting data through the external device 300. The event detection includes key code reception from the remote control device 100 and user key input through the input unit 240 of the mobile terminal 200.

The controller 290 determines whether a key code is received in step S403. If a key code is received, the controller 290 converts the received key code to an operation code for controlling the operation of the mobile terminal 200 in step S405. The controller 290 controls data output through the external device 300 according to the operation code in step S407. For example, the controller 290 controls the mobile terminal 200 to perform an operation according to the operation code corresponding to a key code, such as volume adjustment, channel conversion, suspension, fast-forward winding, and reverse winding, input by the user using the remote control device 100.

If a key code is not received at step S403, the controller 290 determines whether a key is input in step S409. If a key is input, the controller 290 determines whether the input key is a control signal of the output data in step S411. If the input key is a control signal of the output data, the controller 290 controls data output through the external device 300 according to the input key in step S413. For example, the controller 290 controls the mobile terminal 200 to perform the operation according to key codes, such as volume adjustment, channel conversion, suspension, fast-forward winding, and reverse winding, input by the user.

If the input key is not a control signal at step S411, the controller 290 performs an operation according to the input key in step S415. For example, the controller 290 performs an operation according to the user key input, such as ending of data output using the external device 300 and writing of a character message by multitasking.

In exemplary embodiments of the present invention, when digital broadcasting is viewed by connecting the mobile terminal 200 and the external device 300, operation such as channel conversion and volume adjustment can be controlled using the remote control device 100 at a location remote from the mobile terminal 200. Therefore, the user can control the operation of various data output to an external device 300 by conveniently controlling the mobile terminal 200 from a remote location.

As described above, according to the present invention, the user can control a mobile terminal from a remote location using a remote control device, thereby improving user convenience.

Further, when data being reproduced in a mobile terminal are reproduced through an external device, operations such as volume adjustment, channel conversion, suspension, fast-forward winding, and reverse winding of data can be conveniently controlled from a remote location.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of remotely controlling a mobile terminal, the method comprising:
    transmitting a key code directly from a remote control device to a mobile terminal in accordance with a user request;
    receiving the key code in the mobile terminal directly from the remote control device, and recognizing the received key code at the mobile terminal;
    converting the key code into an operation code of the mobile terminal at the mobile terminal; and
    controlling a data output operation at the mobile terminal according to the operation code.

2. The method of claim 1, wherein the key code is a key signal generated in the remote control device.

3. The method of claim 2, further comprising presetting the operation code of the mobile terminal corresponding to the key code.

4. The method of claim 2, wherein the operation code is a control signal for controlling the operation of the mobile terminal.

5. The method of claim 2, wherein the operation code is mapped in a mapping table to correspond to a key code of a remote control device and is preset to the mobile terminal.

6. The method of claim 1, further comprising outputting the output data through an external device.

7. The method of claim 1, further comprising connecting the mobile terminal and the external device through an external interface unit.

8. The method of claim 7, further comprising entering, when the mobile terminal is connected to the external device, a remote control mode.

9. A method of remotely controlling a mobile terminal, comprising:
    when the mobile terminal is connected to an external device, outputting data from the mobile terminal through the external device;
    identifying an event requested at the mobile terminal while outputting the data;
    when the event is a remote control signal received directly from a remote control device, converting the remote control signal into an operation code; and
    converting data for output through the external device to correspond to the operation code, and outputting the converted data from the mobile terminal through the external device.

10. The method of claim 9, wherein the remote control signal comprises a key code generated in the remote control device in order to control the mobile terminal.

11. The method of claim 10, further comprising presetting mapping information for mapping the operation code of the mobile terminal to correspond to the key code generated in the remote control device.

12. The method of claim 9, wherein the event comprises a key code reception event from the remote control device.

13. The method of claim 9, wherein the event comprises a key input event generating in the mobile terminal by a user.

14. The method of claim 9, further comprising entering, when the mobile terminal is connected to the external device, a remote control mode.

15. A mobile terminal comprising:
   a memory unit for storing an application required for controlling operation of the mobile terminal and storing an operation code mapped to a key code generated by a remote control device;
   an external interface unit for connecting the mobile terminal and an external device;
   a local area wireless communication module for receiving a remote control signal directly from the remote control device; and
   a controller for controlling operation of the mobile terminal according to the remote control signal received from the remote control device.

16. The mobile terminal of claim 15, wherein the controller controls, when the remote control signal is received, the remote control signal to be converted to an operation code for controlling the operation of the mobile terminal.

17. The mobile terminal of claim 16, wherein the controller comprises:
   a key code determination unit for recognizing, when a key code is received from the remote control device, the key code;
   a code conversion unit for converting the recognized key code to an operation code for controlling the operation of the mobile terminal; and
   an operation controller for controlling the operation of the mobile terminal according to the converted operation code.

18. The mobile terminal of claim 17, wherein the controller further comprises a mode conversion unit for converting, when a key code is received from the remote control device or when connection to the external device is detected, a mode of the mobile terminal to a remote control mode.

19. The mobile terminal of claim 15, wherein the controller controls, when the remote control signal is received or when connection to the external device is detected, to enter a remote control mode.

20. The mobile terminal of claim 15, wherein the remote control signal comprises a key code generated in the remote control device in order to control the mobile terminal.

21. The mobile terminal of claim 15, wherein the memory unit comprises a code storage unit for storing mapping information for mapping an operation code of the mobile terminal to correspond to a key code.

22. The mobile terminal of claim 15, wherein the external interface unit comprises one of a wire interface, a wireless interface, and a combination thereof.

23. The mobile terminal of claim 15, wherein the local area wireless communication module receives the remote control signal using infrared communication.

* * * * *